United States Patent
Calundann et al.

(10) Patent No.: US 7,235,320 B2
(45) Date of Patent: Jun. 26, 2007

(54) PROTON-CONDUCTING MEMBRANE AND USE THEREOF

(75) Inventors: Gordon Calundann, North Plainfield, NJ (US); Michael J. Sansone, Berkeley Heights, NJ (US); Oemer Uensal, Mainz (DE); Joachim Kiefer, Losheim am See (DE)

(73) Assignee: PEMEAS GmbH (DE)

( * ) Notice: Subject to any disclaimer, the term of this patent is extended or adjusted under 35 U.S.C. 154(b) by 295 days.

(21) Appl. No.: 10/472,810

(22) PCT Filed: Apr. 9, 2002

(86) PCT No.: PCT/EP02/03901

§ 371 (c)(1),
(2), (4) Date: Feb. 10, 2004

(87) PCT Pub. No.: WO02/081547

PCT Pub. Date: Oct. 17, 2002

(65) Prior Publication Data

US 2004/0127588 A1 Jul. 1, 2004

(30) Foreign Application Priority Data

Apr. 19, 2001 (DE) ................................ 101 17 687

(51) Int. Cl.
*H01M 8/10* (2006.01)
(52) U.S. Cl. ........................ 429/30; 429/33; 548/335.1; 548/343.5; 548/219; 548/146; 548/348; 548/156

(58) Field of Classification Search .................. 429/30, 429/33; 548/335.1, 343.5, 219, 146, 348, 548/156
See application file for complete search history.

(56) References Cited

U.S. PATENT DOCUMENTS 3,313,783 A    4/1967  Yoshio et al.
5,525,436 A *  6/1996  Savinell et al. ................ 429/30

FOREIGN PATENT DOCUMENTS

WO    WO 02/088219    12/2002

OTHER PUBLICATIONS

John A. Osaheni et al., "Synthesis and Processing of Heterocyclic Polymers as Electronic, Optoelectronic, and Nonlinear Optical Materials. 4. New Conjugated Rigid-Rod Poly(benzobis(imidazole))s", Macromolecules, 28, 1172-1179, XP 000490475, (1995).

* cited by examiner

*Primary Examiner*—Robert D. Harlan
(74) *Attorney, Agent, or Firm*—Connolly Bove Lodge & Hutz (57) ABSTRACT

The present invention relates to a novel proton-conducting polymer membrane based on polyazoles which can, because of its excellent chemical and thermal properties, be used in a variety of ways and is particularly useful as polymer electrolyte membrane (PEM) to produce membrane electrode units for PEM fuel cells.

40 Claims, 1 Drawing Sheet

Figure 1:
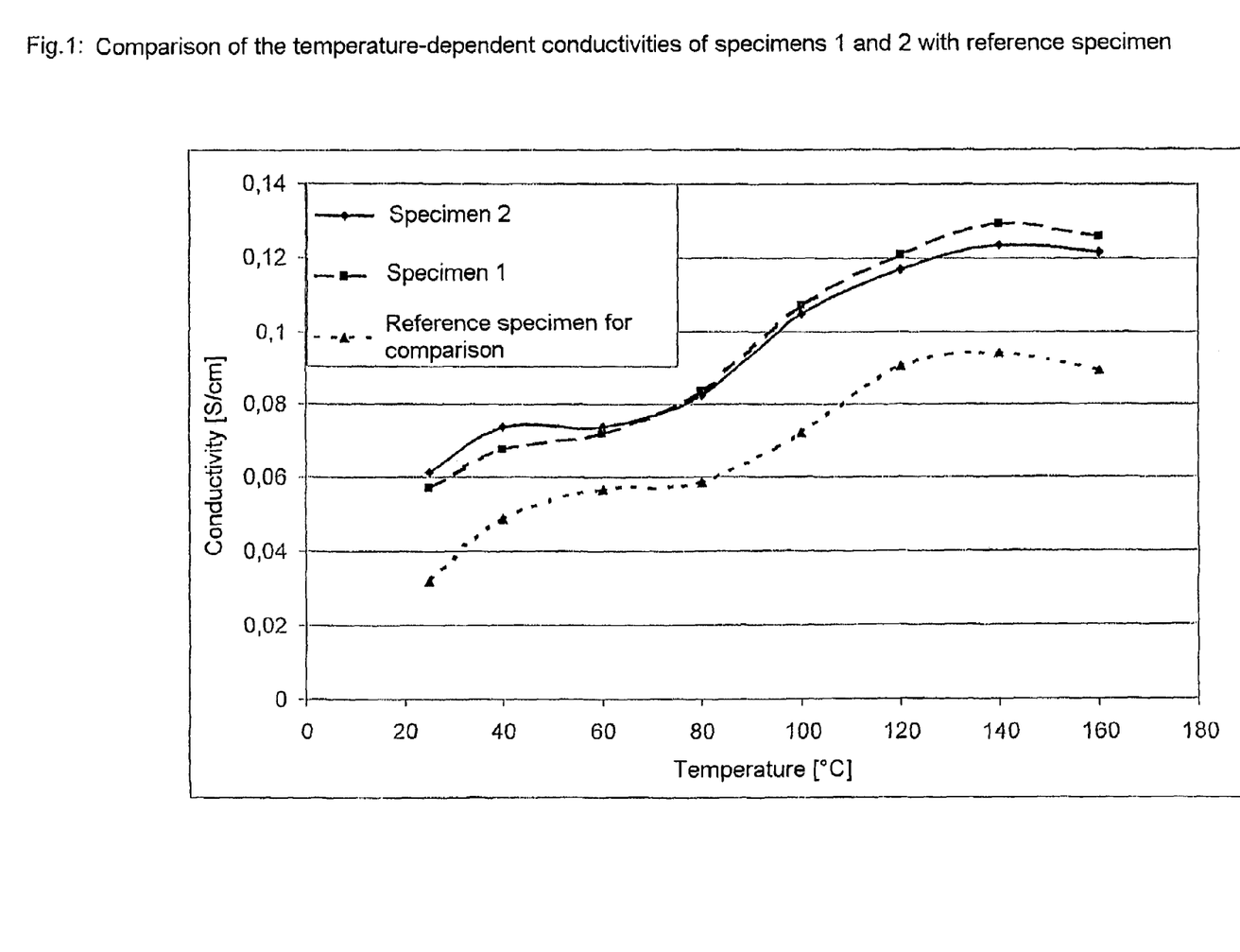

Fig.1: Comparison of the temperature-dependent conductivities of specimens 1 and 2 with reference specimen

PROTON-CONDUCTING MEMBRANE AND USE THEREOF

The present invention relates to a novel proton-conducting polymer membrane based on polyazoles which can, because of its excellent chemical and thermal properties, be used in a variety of ways and is particularly useful as polymer electrolyte membrane (PEM) in PEM fuel cells.

Polyazoles such as polybenzimidazoles (®Celazole) have been known for a long time. The preparation of such polybenzimidazoles (PBI) is usually carried out by reacting 3,3',4,4'-tetraminobiphenyl with isophthalic acid or diphenylisophthalic acid or their esters in the melt. The prepolymer formed solidifies in the reactor and is subsequently comminuted mechanically. The pulverulent prepolymer is subsequently fully polymerized in a solid-phase polymerization at temperatures of up to 400° C. to give the desired polybenzimidazoles.

To produce polymer films, the PBI is dissolved in polar, aprotic solvents such as dimethylacetamide (DMAc) and a film is produced by classical methods.

Proton-conducting, i.e. acid-doped, polyazole membranes for use in PEM fuel cells are already known. The basic polyazole films are doped with concentrated phosphoric acid or sulfuric acid and then act as proton conductors and separators in polymer electrolyte membrane fuel cells (PEM fuel cells).

Due to the excellent properties of the polyazole polymer, such polymer electrolyte membranes can, when converted into membrane-electrode units (MEEs), be used in fuel cells at continuous operating temperatures above 100° C., in particular above 120° C. This high continuous operating temperature allows the activity of the catalysts based on noble metals present in the membrane-electrode unit (MEE) to be increased. Particularly when using reforming products from hydrocarbons, significant amounts of carbon monoxide are present in the reformer gas and these usually have to be removed by means of a complicated gas work-up or gas purification. The ability to increase the operating temperature makes it possible to tolerate significantly higher concentrations of CO impurities in long-term operation.

The use of polymer electrolyte membranes based on polyazole polymers enables, firstly, the complicated gas work-up or gas purification to be omitted, at least in part, and, secondly, allows the catalyst loading in the membrane-electrode unit to be reduced. Both are indispensable prerequisites for wide use of PEM fuel cells since otherwise the costs of a PEM fuel cell system are too high.

The previously known acid-doped polymer membranes based on polyazoles display an advantageous property profile. However, an overall improvement in these properties has to be achieved in order to be able to use PEM fuel cells in the intended applications, in particular in the automobile sector and in decentralized power and heat generation (stationary applications). In addition, the polymer membranes known hitherto have a high content of dimethylacetamide (DMAc) which cannot be removed completely by means of known drying methods. The German patent application No. 10109829.4 describes a polymer membrane based on polyazoles in the case of which the DMAc contamination was eliminated. Although such polymer membranes display improved mechanical properties, the specific conductivity does not exceed 0.1 S/cm (at 140° C.).

It is an object of the present invention to provide acid-containing polymer membranes based on polyazoles which, firstly, have the use advantages of the polymer membrane based on polyazoles and, secondly, display an increased specific conductivity, in particular at operating temperatures above 100° C., and additionally make do without humidification of the fuel gas.

We have now found that a proton-conducting membrane based on polyazoles can be obtained when the polyazole prepolymers is fully polymerized in polyphosphoric acid.

In the case of this novel membrane, the specific aftertreatment described in the German patent application No. 10109829.4 can be dispensed with. The doped polymer membranes display a significantly improved proton conductivity and the subsequent doping of the film is dispensed with.

The present invention provides a proton-conducting polymer membrane based on polyazoles which is obtainable by a process comprising the steps A) Reaction of one or more aromatic tetramino compounds with one or more aromatic carboxylic acids or esters thereof which contain at least two acid groups per carboxylic acid monomer, or of one or more aromatic and/or heteroaromatic diaminocarboxylic acids in the melt at temperatures of up to 350° C., preferably up to 300° C., B) Dissolution of the solid prepolymer obtained as described in step A) in polyphosphoric acid, C) Heating of the solution obtainable as described in step B) to temperatures of up to 300° C., preferably up to 280° C., under inert gas to form the dissolved polyazole polymer, D) Formulation of a membrane on a support using the solution of the polyazole polymer from step C), and E) Treatment of the membrane formed in step D) until it is self-supporting.

The aromatic and heteroaromatic tetramino compounds used according to the invention are preferably 3,3',4,4'-tetraminobiphenyl, 2,3,5,6-tetraminopyridine, 1,2,4,5-tetraminobenzene, bis(3,4-diaminophenyl) sulfone, bis(3,4-diaminophenyl) ether, 3,3',4,4'-tetraminobenzophenone, 3,3',4,4'-tetraminodiphenylmethane and 3,3',4,4'-tetraminodiphenyldimethylmethane and also their salts, in particular their mono-, di-, tri- and tetrahydrochloride derivatives.

The aromatic carboxylic acids used according to the invention are dicarboxylic acids and tricarboxylic acids and tetracarboxylic acids or their esters or anhydrides or acid chlorides. The term aromatic carboxylic acids also encompasses heteroaromatic carboxylic acids. The aromatic dicarboxylic acids are preferably isophthalic acid, terephthalic acid, phthalic acid, 5-hydroxyisophthalic acid, 4-hydroxyisophthalic acid, 2-hydroxyterephthalic acid, 5-aminoisophthalic acid, 5-N,N-dimethylaminoisophthalic acid, 5-N,N-diethylaminoisophthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid; 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid or their C1–C20-alkyl esters or C5–C12-aryl esters or their acid anhydrides or acid chlorides. The aromatic tricarboxylic or tetracarboxylic acids and their C1–C20-alkyl esters or C5–C12-aryl esters or their acid anhydrides or acid chlorides are preferably 1,3,5-benzenetricarboxylic acid (trimesic acid), 1,2,4-benzenetricarboxylic acid (trimellitic acid), (2-carboxyphenyl)iminodiacetic acid, 3,5,3'-biphenyltricarboxylic acid, 3,5,4'-biphenyltricarboxylic acid.

The aromatic tetracarboxylic acids or their C1–C20-alkyl esters or C5–C12-aryl esters or their acid anhydrides or acid chlorides are preferably 3,5,3',5'-biphenyltetracarboxylic acid, 1,2,4,5-benzenetetracarboxylic acid, benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, 1,4,5,8-naphthalenetetracarboxylic acid.

The heteroaromatic carboxylic acids used according to the invention are heteroaromatic dicarboxylic acids and tricarboxylic acids and tetracarboxylic acids or esters or anhydrides thereof. For the purposes of the present invention, heteroaromatic carboxylic acids are aromatic systems in which at least one nitrogen, oxygen, sulfur or phosphorus atom is present in the aromatic. Preference is given to pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, 2,4,6-pyridinetricarboxylic acid, benzimidazole-5,6-dicarboxylic acid, and also their C1–C20-alkyl esters or C5–C12-aryl esters or their acid anhydrides or acid chlorides.

The content of tricarboxylic acids or tetracarboxylic acids (based on dicarboxylic acid used) is from 0 to 30 mol %, preferably from 0.1 to 20 mol %, in particular from 0.5 to 10 mol %.

The aromatic and heteroaromatic diaminocarboxylic acids used according to the invention are preferably diaminobenzoic acid and its monohydrochloride and dihydrochloride derivatives.

In step A), preference is given to using mixtures of at least 2 different aromatic carboxylic acids. Particular preference is given to using mixtures comprising aromatic carboxylic acids together with heteroatomic carboxylic acids. The mixing ratio of aromatic carboxylic acids to heteroaromatic carboxylic acids is in the range from 1:99 to 99:1, preferably from 1:50 to 50:1.

In particular, these mixtures are mixtures of N-heteroaromatic dicarboxylic acids and aromatic dicarboxylic acids. Nonlimiting examples are isophthalic acid, terephthalic acid, phthalic acid, 2,5-dihydroxyterephthalic acid, 2,6-dihydroxyisophthalic acid, 4,6-dihydroxyisophthalic acid, 2,3-dihydroxyphthalic acid, 2,4-dihydroxyphthalic acid, 3,4-dihydroxyphthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis (4-carboxyphenyl) ether, benzophenone-4,4'-dicarboxylic acid, bis(4-carboxyphenyl) sulfone, biphenyl-4,4'-dicarboxylic acid, 4-trifluoromethylphthalic acid, pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid.

The prepolymerization in step A) leads, in the selected temperature range and when using 3,3',4,4'-tetraminobiphenyl (TAB) and isophthalic esters (OR), to formation of the corresponding amides or imines (cf. the scheme below)

During the reaction, the prepolymer obtained becomes solid and can, if desired after coarse milling, be dissolved in polyphosphoric acid.

The polyphosphoric acid used in step B) is a commercial polyphosphoric acid as is obtainable, for example, from Riedel-de Haen. The polyphosphoric acids $H_{n+2}P_nO_{3n+1}$ (n>1) usually have an assay calculated as $P_2O_5$ (acidimetric) of at least 83%. Instead of a solution of the prepolymer, it is also possible to produce a dispersion/suspension.

The mixture produced in step B) has a weight ratio of polyphosphoric acid to the sum of prepolymer of from 1:10000 to 10000:1, preferably from 1:1000 to 1000:1, in particular from 1:100 to 100:1.

The polyazole-based polymer formed in step C) comprises recurring azole units of the formula (I) and/or (II) and/or (III) and/or (IV) and/or (V) and/or (VI) and/or (VII) and/or (VIII) and/or (IX) and/or (X) and/or (XI) and/or (XII) and/or (XIII) and/or (XIV) and/or (XV) and/or (XVI) and/or (XVI) and/or (XVII) and/or (XVIII) and/or (XIX) and/or (XX) and/or (XXI) and/or (XXII)

-continued (XVI)

(XVII)

(XVIII)

(XIX)

(XX)

(XXI)

(XXII)

where

Ar are identical or different and are each a tetravalent aromatic or heteroaromatic group which may have one or more rings, $Ar^1$ are identical or different and are each a divalent aromatic or heteroaromatic group which may have one or more rings, $Ar^2$ are identical or different and are each a divalent or trivalent aromatic or heteroaromatic group which may have one or more rings, $Ar^3$ are identical or different and are each a trivalent aromatic or heteroaromatic group which may have one or more rings, $Ar^4$ are identical or different and are each a trivalent aromatic or heteroaromatic group which may have one or more rings, $Ar^5$ are identical or different and are each a tetravalent aromatic or heteroaromatic group which may have one or more rings, $Ar^6$ are identical or different and are each a divalent aromatic or heteroaromatic group which may have one or more rings, $Ar^7$ are identical or different and are each a divalent aromatic or heteroaromatic group which may have one or more rings, $Ar^8$ are identical or different and are each a trivalent aromatic or heteroaromatic group which may have one or more rings, $Ar^9$ are identical or different and are each a divalent or trivalent or tetravalent aromatic or heteroaromatic group which may have one or more rings, $Ar^{10}$ are identical or different and are each a divalent or trivalent aromatic or heteroaromatic group which may have one or more rings, $Ar^{11}$ are identical or different and are each a divalent aromatic or heteroaromatic group which may have one or more rings, X are identical or different and are each oxygen, sulfur or an amino group bearing a hydrogen atom, a group having 1–20 carbon atoms, preferably a branched or unbranched alkyl or alkoxy group, or an aryl group as further radical, R are identical or different and are each hydrogen, an alkyl group or an aromatic group and n, m are each an integer greater than or equal to 10, preferably greater than or equal to 100.

Preferred aromatic or heteroaromatic groups are derived from benzene, naphthalene, biphenyl, diphenyl ether, diphenylmethane, diphenyldimethylmethane, bisphenone, diphenyl sulfone, quinoline, pyridine, bipyridine, pyridazine, pyrimidine, pyrazine, triazine, tetrazine, pyrrole, pyrazole, anthracene, benzopyrrole, benzotriazole, benzooxathiadiazole, benzooxadiazole, benzopyridine, benzopyrazine, benzopyrazidine, benzopyrimidine, benzopyrazine, benzotriazine, indolizine, quinolizine, pyridopyridine, imidazopyrimidine, pyrazinopyrimidine, carbazole, aciridine, phenazine, benzoquinoline, phenoxazine, phenothiazine, acridizine, benzopteridine, phenanthroline and phenanthrene, which may also be substituted.

$Ar^1$, $Ar^4$, $Ar^6$, $Ar^7$, $Ar^8$, $Ar^9$, $Ar^{10}$, $Ar^{11}$ can have any substitution pattern; in the case of phenylene for example, $Ar^1$, $Ar^4$, $Ar^6$, $Ar^7$, $Ar^8$, $Ar^9$, $Ar^{10}$, $Ar^{11}$ can each be ortho-, meta- or para-phenylene. Particularly preferred groups are derived from benzene and biphenyls, which may also be substituted.

Preferred alkyl groups are short-chain alkyl groups having from 1 to 4 carbon atoms, e.g. methyl, ethyl, n-propyl or i-propyl and t-butyl groups.

Preferred aromatic groups are phenyl or naphthyl groups. The alkyl groups and the aromatic groups may be substituted.

Preferred substituents are halogen atoms such as fluorine, amino groups, hydroxy groups or short-chain alkyl groups such as methyl or ethyl groups.

Preference is given to polyazoles comprising recurring units of the formula (i) in which the radicals X are identical within a recurring unit.

The polyazoles can in principle also comprise different recurring units which differ, for example, in their radical X. However, they preferably have only identical radicals X in a recurring unit.

Further, preferred polyazole polymers are polyimidazoles, polybenzothiazoles, polybenzoxazoles, polyoxadiazoles, polyquinoxalines, polythiadiazoles, poly(pyridines), poly(pyrimidines), and poly(tetrazapyrenes).

In a further embodiment of the present invention, the polymer comprising recurring azole units is a copolymer or a blend comprising at least two units of the formulae (I) to (XXII) which differ from one another. The polymers can be present as block copolymers (diblock, triblock), random copolymers, periodic copolymers and/or alternating polymers.

In a particularly preferred embodiment of the present invention, the polymer comprising recurring azole units is a polyazole which contains only units of the formula (I) and/or (II).

The number of recurring azole units in the polymer is preferably greater than or equal to 10. Particularly preferred polymers have at least 100 recurring azole units.

For the purposes of the present invention, polymers comprising recurring benzimidazole units are preferred. Some examples of the extremely advantageous polymers comprising recurring benzimidazole units have the following formulae:

-continued where n and m are each an integer greater than or equal to 10, preferably greater than or equal to 100.

The polyazoles obtainable by means of the process described, in particular the polybenzimidazoles, have a high molecular weight. Measured as intrinsic viscosity, this is at least 1.4 dl/g and is thus significantly above that of commercial polybenzimidazole (IV<1.1 dl/g).

If the mixture obtained in step A) comprises tricarboxylic acids or tetracarboxylic acids, branching/crosslinking of the polymer formed is achieved in this way. This contributes to an improvement in the mechanical properties.

The formation of the polymer membrane in step D) is carried out by means of measures (casting, spraying, doctor blade coating) which are known per se from the prior art for polymer film production. As supports, it is possible to use all supports which are inert under the conditions employed. To adjust the viscosity, the solution can, if necessary, be admixed with phosphoric acid (concentrated phosphoric acid, 85%). In this way, the viscosity can be set to the desired value and the formation of the membrane can be made easier. The thickness is from 20 to 4000 μm, preferably from 30 to 3500 μm, in particular from 50 to 3000 μm.

The membrane produced in step E) is treated at elevated temperatures in the presence of moisture for a sufficient time until the membrane is self-supporting, so that it can be detached from the support without damage.

The treatment of the membrane in step E) is carried out at temperatures above 0° C. and less than 150° C., preferably at temperatures of from 10° C. to 120° C., in particular from room temperature (20° C.) to 90° C., in the presence of moisture or water and/or water vapor and/or water-containing phosphoric acid having a concentration of up to 85%. The treatment is preferably carried out at atmospheric pressure, but can also be carried out at superatmospheric pressure. It is important for the treatment to occur in the presence of sufficient moisture so that the polyphosphoric acid present contributes to strengthening of the membrane as a result of partial hydrolysis to form low molecular weight polyphosphoric acid and/or phosphoric acid.

The partial hydrolysis of the polyphosphoric acid in step E) leads to strengthening of the membrane and to a decrease in the thickness and formation of a membrane having a thickness of from 15 to 3000 µm, preferably from 20 to 2000 µm, in particular from 20 to 1500 nm, which is self-supporting.

The intramolecular and intermolecular structures (interpenetrating networks, IPNs) present in the polyphosphoric acid layer lead to ordered membrane formation which is responsible for the particular properties of the membrane formed.

The upper temperature limit for the treatment in step D) is generally 150° C. If moisture is present for an extremely short time, for example in the case of superheated steam, this steam can also be hotter than 150° C. The important factor in determining the upper temperature limit is the duration of the treatment.

The partial hydrolysis (step E) can also be carried out in temperature- and humidity-controlled chambers so that the hydrolysis can be controlled in a targeted manner in the presence of a defined amount of moisture. The amount of moisture can in this case be set in a targeted manner by means of the temperature or saturation of the environment in contact with the membrane, for example gases such as air, nitrogen, carbon dioxide or other suitable gases, or steam. The treatment time is dependent on the above parameters chosen.

Furthermore, the treatment time is dependent on the thickness of the membrane.

The treatment time is generally in the range from a few seconds to some minutes, for example under the action of superheated steam, or up to a number of days, for example in air at room temperature and a low relative atmospheric humidity. The treatment time is preferably from 10 seconds to 300 hours, in particular from 1 minute to 200 hours.

If the partial hydrolysis is carried out at room temperature (20° C.) using ambient air having a relative atmospheric humidity of 40–80%, the treatment time is from 1 to 200 hours.

The membrane obtained in step E) can be made self-supporting, i.e. it can be detached from the support without damage and subsequently be processed further immediately if desired.

The concentration of phosphoric acid and thus the conductivity of the polymer membrane according to the invention can be set via the degree of hydrolysis, i.e. the time, temperature and ambient moisture level. According to the invention, the concentration of phosphoric acid is reported as mole of acid per mole of repeating units of the polymer. For the purposes of the present invention, a concentration (mole of phosphoric acid per repeating unit of polybenzimidazole) of from 10 to 50, in particular from 12 to 40, is preferred. Such high degrees of doping (concentrations) are very difficult or impossible to achieve by doping polyazoles with commercially available ortho-phosphoric acid.

Subsequent to the treatment as described in step E), the membrane can be crosslinked on the surface by action of heat in the presence of atmospheric oxygen. This hardening of the membrane surface effects an additional improvement in the properties of the membrane.

Crosslinking can also be achieved by action of IR or NIR (IR=infrared, i.e. light having a wavelength of more than 700 nm; NIR=near IR, i.e. light having a wavelength in the range from about 700 to 2000 nm or an energy in the range from about 0.6 to 1.75 eV). A further method is irradiation with β-rays. The radiation dose is in this case in the range from 5 to 200 kGy.

The polymer membrane of the invention has improved materials properties compared to the doped polymer membranes known hitherto. In particular, it displays improved performance compared to known doped polymer membranes. This is due, in particular, to an improved proton conductivity. This is at least 0.1 S/cm, preferably at least 0.11 S/cm, in particular at least 0.12 S/cm, at a temperature of 120° C.

To achieve a further improvement in the use properties, fillers, in particular proton-conducting fillers, and also additional acids can be additionally added to the membrane. The addition can be carried out either during step B), C) or before step D).

Nonlimiting examples of proton-conducting fillers are

Sulfates such as $CsHSO_4$, $Fe(SO_4)_2$, $(NH_4)_3H(SO_4)_2$, $LiHSO_4$, $NaHSO_4$, $KHSO_4$, $RbSO_4$, $LiN_2H_5SO_4$, $NH_4HSO_4$, Phosphates such as $Zr_3(PO_4)_4$, $Zr(HPO_4)_2$, $HZr_2(PO_4)_3$, $UO_2PO_4 \cdot 3H_2O$, $H_8UO_2PO_4$, $Ce(HPO_4)_2$, $Ti(HPO_4)_2$, $KH_2PO_4$, $NaH_2PO_4$, $LiH_2PO_4$, $NH_4H_2PO_4$, $CsH_2PO_4$, $CaHPO_4$, $MgHPO_4$, $HSbP_2O_8$, $HSb_3P_2O_{14}$, $H_5Sb_5P_2O_{20}$, Polyacids such as $H_3PW_{12}O_{40} \cdot nH_2O$ (n=21–29), $H_3SiW_{12}O_{40} \cdot nH_2O$ (n=21–29), $H_xWO_3$, $HSbWO_6$, $H_3PMo_{12}O_{40}$, $H_2Sb_4O_{11}$, $HTaWO_6$, $HNbO_3$, $HTiNbO_5$, $HTiTaO_5$, $HSbTeO_6$, $H_5Ti_4O_9$, $HSbO_3$, $H_2MoO_4$ Selenites and arsenides such as $(NH_4)_3H(SeO_4)_2$, $UO_2AsO_4$, $(NH_4)_3H(SeO_4)_2$, $KH_2AsO_4$, $Cs_3H(SeO_4)_2$, $Rb_3H(SeO_4)_2$, Oxides such as $Al_2O_3$, $Sb_2O_5$, $ThO_2$, $SnO_2$, $ZrO_2$, $MoO_3$ Silicates such as zeolites, zeolites($NH_4+$), sheet silicates, network silicates, H-natrolites, H-mordenites, $NH_4$-analcines, $NH_4$-sodalites, $NH_4$-gallates, H-montmorillonites Acids such as $HClO_4$, $SbF_5$ Fillers such as carbides, in particular SiC, $Si_3N_4$, fibers, in particular glass fibers and/or polymer fibers, preferably those based on polyazoles.

This membrane can also further comprise perfluorinated sulfonic acid additives (0.1–20% by weight, preferably 0.2–15% by weight, very particularly preferably 0.2–10% by weight). These additives lead to a performance improvement, in the vicinity of the cathode to an increase in the oxygen solubility and oxygen diffusion and to a decrease in the adsorption of phosphoric acid and phosphate on platinum. (Electrolyte additives for phosphoric acid fuel cells. Gang, Xiao; Hjuler, H. A.; Olsen, C.; Berg, R. W.; Bjerrum, N. J. Chem. Dep. A, Tech. Univ. Denmark, Lyngby, Den. J. Electrochem. Soc. (1993), 140(4), 896–902, and perfluorosulfonimide as an additive in phosphoric acid fuel cell. Razaq, M.; Razaq, A.; Yeager, E.; DesMarteau, Darryl D.; Singh, S. Case Cent. Electrochem. Sci., Case West. Reserve Univ., Cleveland, Ohio, USA. J. Electrochem. Soc. (1989), 136(2), 385–90.)

Nonlimiting examples of persulfonated additives are:

Trifluoromethanesulfonic acid, potassium trifluoromethanesulfonate, sodium trifluoromethanesulfonate, lithium trifluoromethanesulfonate, ammonium trifluoromethanesulfonate, potassium perfluorohexanesulfonate, sodium perfluorohexanesulfonate, lithium perfluorohexanesulfonate, ammonium perfluorohexanesulfonate, perfluorohexanesulfonic acid, potassium nonafluorobutanesulfonate, sodium nonafluorobutanesulfonate, lithium nonafluorobutanesulfonate, ammonium nonafluorobutanesulfonate, cesium nonafluorobutanesulfonate, triethylammonium perfluorohexanesulfonate, perfluorosulfonimides and Nafion.

Furthermore, the membrane can further comprise additives which scavenge (primary antioxidants) or destroy (secondary antioxidants) the peroxide radicals generated by reduction of oxygen in operation and thereby increase the life and stability of the membrane and membrane electrode unit, as described in JP2001118591 A2. The molecular structures of such additives and the way in which they function are described in F. Gugumus in Plastics Additives, Hanser Verlag, 1990; N. S. Allen, M. Edge Fundamentals of Polymer Degradation and Stability, Elsevier, 1992; or H. Zweifel, Stabilization of Polymeric Materials, Springer, 1998.

Nonlimiting examples of such additives are:
bis(trifluoromethyl) nitroxide, 2,2-diphenyl-1-picrinylhydrazyl, phenols, alkylphenols, sterically hindered alkylphenols such as Irganox, aromatic amines, sterically hindered amines such as Chimassorb; sterically hindered hydroxylamines, sterically hindered alkylamines, sterically hindered hydroxylamines, sterically hindered hydroxylamine ethers, phosphites such as Irgafos, nitrosobenzene, methyl-2-nitrosopropane, benzophenone, benzaldehyde tert-butylnitrone, cysteamine, melamines, lead oxides, manganese oxides, nickel oxides, cobalt oxides.

The possible fields of use of the doped polymer membranes according to the invention include, inter alia, use in fuel cells, in electrolysis, in capacitors and in battery systems. Owing to their property profile, the doped polymer membranes are preferably used in fuel cells.

The present invention also relates to a membrane-electrode unit comprising at least one polymer membrane according to the invention. For further information on membrane-electrode units, reference may be made to the specialist literature, in particular the patents U.S. Pat. Nos. 4,191,618, 4,212,714 and 4,333,805. The disclosure in the abovementioned references [U.S. Pat. Nos. 4,191,618, 4,212,714 and 4,333,805] regarding the structure and production of membrane-electrode units and the electrodes, gas diffusion layers and catalysts to be chosen is hereby incorporated by reference into the present description.

In one variant of the present invention, the membrane can be formed directly on the electrode rather than on a support. The treatment in step E) can be shortened in this way, since the membrane no longer has to be self-supporting. Such a membrane is also subject matter of the present invention.

The present invention further provides an electrode provided with a proton-conducting polymer coating based on polyazoles which is obtainable by a process comprising the steps A) Reaction of one or more aromatic tetramino compounds with one or more aromatic carboxylic acids or esters thereof which contain at least two acid groups per carboxylic acid monomer, or of one or more aromatic and/or heteroaromatic diaminocarboxylic acids in the melt at temperatures of up to 350° C., preferably up to 300° C., B) Dissolution of the solid prepolymer obtained as described in step A) in polyphosphoric acid, C) Heating of the solution obtainable as described in step B) to temperatures of up to 300° C., preferably 280° C., under inert gas to form the dissolved polyazole polymer, D) Application of a layer to an electrode using the solution of the polyazole polymer from step C), and E) Treatment of the layer formed in step D).

The coating has a thickness of from 2 to 3000 μm, preferably from 3 to 2000 μm, in particular from 5 to 1500 μm.

An electrode which has been coated in this way can be incorporated in a membrane-electrode unit which may, if desired, comprise at least one polymer membrane according to the invention.

General Measurement Methods:

Method of Measuring the IEC

The conductivity of the membrane is dependent to a high degree on the content of acid groups expressed by the ion exchange capacity (IEC). To measure the ion exchange capacity, a specimen having a diameter of 3 cm is stamped out and placed in a glass beaker filled with 100 ml of water. The acid liberated is titrated with 0.1 M NaOH. The specimen is subsequently taken out, excess water is dabbed off and the specimen is dried at 160° C. for 4 hours. The dry weight, $m_0$, is then determined gravimetrically to a precision of 0.1 mg. The ion exchange capacity is then calculated from the consumption of 0.1M NaOH to the first titration end point, $V_1$ in ml, and the dry weight, $m_0$ in mg, according to the following formula:

$$IEC = V_1 * 300/m_0$$

Method of Measuring the Specific Conductivity

The specific conductivity is measured by means of impedance spectroscopy in a 4-pole arrangement in the potentiostatic mode using platinum electrodes (wire, 0.25 mm diameter). The distance between the current-collecting electrodes is 2 cm. The spectrum obtained is evaluated using a simple model consisting of a parallel arrangement of an ohmic resistance and a capacitor. The specimen cross section of the membrane doped with phosphoric acid is measured immediately before installation of the specimen. To measure the temperature dependence, the measurement cell is brought to the desired temperature in an oven and the temperature is regulated via a Pt-100 resistance thermometer positioned in the immediate vicinity of the specimen. After the desired temperature has been reached, the specimen is held at this temperature for 10 minutes before commencement of the measurement.

EXAMPLES

Specimen 1

10 g of prepolymer were placed under a nitrogen atmosphere in a three-neck flask provided with a mechanical stirrer and $N_2$ inlet and outlet. 90 g of polyphosphoric acid (83.4±0.5% $P_2O_5$, as determined by analysis) were added to the prepolymer. The mixture was firstly heated to 150° C. and stirred for one hour. The temperature was then increased to 180° C. for 4 hours, then to 240° C. for 4 hours and finally to 270° C. for 14 hours. At 270° C., 25 g of 85% strength phosphoric acid were added to this solution and the mixture was stirred for 1 hour. The solution obtained was then cooled to 225° C. to give a still fluid solution for film casting. This warm solution was applied to a glass plate using a 350 μm doctor blade coater, with the doctor blade coater and the glass plate having been heated beforehand to 100° C. The membrane was allowed to stand in air at room temperature (RT=20° C.) for 3 days. The polyphosphoric acid attracted moisture from the air and was hydrolyzed to phosphoric acid by the moisture absorbed from the air. The excess phosphoric acid formed flowed from the membrane. The weight loss was 22% based on the initial weight of the membrane applied by means of the doctor blade.

Part of the solution was precipitated after the thermal treatment by mixing with distilled water, filtered, washed three times with distilled water, neutralized with ammonium hydroxide, then washed three times with distilled water and finally dried at 120° C. and 1 torr for 16 hours. This gave 2.9 g of PBI powder having an ηinh of 1.47 dl/g measured on a 0.4% strength PBI solution in 100 ml of concentrated sulfuric acid (97%).

Specimen 2

10 g of prepolymer were placed under a nitrogen atmosphere in a three-neck flask provided with a mechanical stirrer and $N_2$ inlet and outlet. 90 g of polyphosphoric acid (83.4±0.5% $P_2O_5$, as determined by analysis) were added to the prepolymer. The mixture was firstly heated to 150° C. and stirred for one hour. The temperature was then increased to 180° C. for 4 hours, then to 240° C. for 4 hours and finally to 270° C. for 14 hours. At 270° C., 25 g of 85% strength phosphoric acid were added to this solution and the mixture was stirred for 1 hour. The solution obtained was then cooled to 240° C. to give a still fluid homogeneous solution for film casting. This warm solution was applied to a glass plate by means of 350 μm, 700 μm, 930 μm and 1170 μm doctor blade coaters, with the doctor blade coater and the glass plate having been heated beforehand to 100° C. The membrane was allowed to stand in air at RT for 5 days. The polyphosphoric acid attracted moisture from the air and was hydrolyzed to phosphoric acid by the moisture absorbed from the air. The excess phosphoric acid formed flowed from the membrane. The weight loss of membranes was in the range from 37.5 to 40% based on the initial weight of the membrane applied by means of the doctor blade. The final thicknesses of the membranes were 210 μm, 376 μm, 551 μm and 629 μm.

Part of the solution was precipitated after the thermal treatment by mixing with distilled water, filtered, washed three times with distilled water, neutralized with ammonium hydroxide, then washed three times with distilled water and finally dried at 120° C. and 1 torr for 16 hours. An intrinsic viscosity of ηinh=2.23 dl/g, measured on a 0.4% strength PBI solution in 100 ml of concentrated sulfuric acid (97%), was obtained for the PBI powder.

Specimen 3

10 g of prepolymer were placed under a nitrogen atmosphere in a three-neck flask provided with a mechanical stirrer and $N_2$ inlet and outlet. 90 g of polyphosphoric acid (83.4±0.5% $P_2O_5$, as determined by analysis) were added to the prepolymer. The mixture was firstly heated to 150° C. and stirred for one hour. The temperature was then increased to 180° C. for 4 hours, then to 240° C. for 4 hours and finally to 270° C. for 14 hours. At 270° C., 25 g of 85% strength phosphoric acid were added to this solution and the mixture was stirred for 1 hour. The solution obtained was then cooled to 240° C. to give a still fluid homogeneous solution for film casting. The warm, 6.5% strength PBI solution in 104% strength polyphosphoric acid was applied at 200° C. to a glass plate by means of 350 μm, 230 μm, 190 μm and 93 μm doctor blade coaters, with the doctor blade coater and the glass plate having been heated beforehand to 100° C. The membrane was allowed to stand in air at RT for 7 days. The polyphosphoric acid attracted moisture from the air and was hydrolyzed to phosphoric acid by the moisture absorbed from the air. The excess phosphoric acid formed flowed from the membrane. The final thicknesses of the membranes were 201 μm, 152 μm, 126 μm and 34 μm.

Part of the solution was precipitated after the thermal treatment by mixing with distilled water, filtered, washed three times with distilled water, neutralized with ammonium hydroxide, then washed three times with distilled water and finally dried at 120° C. and 1 torr for 16 hours. An intrinsic viscosity of ηinh=2.6 dl/g, measured on a 0.4% strength PBI solution in 100 ml of concentrated sulfuric acid (97%), was obtained for the PBI powder.

In Table 1, the ion exchange capacities and $n(H_3PO_4)/n$(PBI) values of specimens 1–3 are compared with the reference specimen. These values are obtained by titration with 0.1 M NaOH.

TABLE 1

Comparison of ion exchange capacities and $n(H_3PO_4)/n$(PBI) values

| Designation of the membrane | $n(H_3PO_4)/n$(PBI) | I.E.C. |
|---|---|---|
| Specimen 1 | 16.2 | 157.6 |
| Specimen 2 | 15.0 | 145.6 |
| Specimen 3 | 18.7 | 182.6 |
| Reference specimen for comparison | 9.1 | 88.5 |

FIG. 1 shows the temperature-dependent conductivies of specimen 1, specimen 2 and the reference specimen. The temperature-dependent conductivity measurement was carried out using a specially constructed 4-pole glass measuring cell. An IM6 impedance spectrometer from Zahner Elektrik was used.

The invention claimed is:

1. A proton-conducting polymer membrane based on polyazoles which is obtained by a process comprising the steps
    A) Reacting one or more aromatic tetraamino compounds with one or more aromatic carboxylic acids or esters thereof which contain at least two acid groups per carboxylic acid monomer, or of one or more aromatic and/or heteroaromatic diaminocarboxylic acids in the melt at temperatures of up to 350° C.,
    B) Dissolution of the solid prepolymer obtained as described in step A) in polyphosphoric acid,
    C) Heating of the solution obtained as described in step B) to temperatures of up to 300° C., under inert gas to form the dissolved polyazole polymer,
    D) Formulating a membrane on a support using the solution of the polyazole polymer from step C), and
    E) Treating the membrane formed in step D) until it is self-supporting.

2. The membrane as claimed in claim 1, wherein step A is conducted at a temperature up to 300° C. and step C is conducted at a temperature up to 280° C.

3. The membrane as claimed in claim 1, wherein said aromatic tetraamino compounds used are 3,3',4,4'-tetraaminobiphenyl,2,3,5,6-tetraaminopyridine, 1,2,4,5-tetraaminobenzene, bis(3,4-diaminophenyl) sulfone, bis(3,4-diaminophenyl) ether,3,3',4,4'-tetraaminobenzophenone,3,3',4,4'-tetraaminodiphenylmethane and 3,3',4,4'-tetraaminodiphenyldimethylmethane.

4. The membrane as claimed in claim 1, wherein said aromatic dicarboxylic acids used are isophthalic acid, terephthalic acid, phthalic acid,5-hydroxyisophthalic acid,4-hydroxyisophthalic acid, 2-hydroxyterephthalic acid, 5-aminoisophthalic acid, 5-N,N-dimethylaminoisophthalic acid, 5-N,N -diethylaminoisophthalic acid, 2,5-dihydroxyterephthalic acid, 2,5-dihydroxyisophthalic acid, 2,3-dihydroxyisophthalic acid, 2,3-dihydroxyphthalic acid, 2,4-dihydroxyphthalic acid, 3,4-dihydroxyphthalic acid, 3-fluorophthalic acid, 5-fluoroisophthalic acid, 2-fluoroterephthalic acid, tetrafluorophthalic acid, tetrafluoroisophthalic acid, tetrafluoroterephthalic acid, 1,4-naphthalenedicarboxylic acid, 1,5-naphthalenedicarboxylic acid, 2,6-naphthalenedicarboxylic acid, 2,7-naphthalenedicarboxylic acid, diphenic acid, 1,8-dihydroxynaphthalene-3,6-dicarboxylic acid, bis(4-carboxyphenyl) ether, benzophenone-4,4'-dicarboxylic acid, bis(4- cargoxyphenyl) sulfone, biphenyl-4,4'-dicarboxylic acid, 4-trifluoromethylphthalic acid, 2,2-bis(4-carboxyphenyl) hexafluoropropane, 4,4'-stilbenedicarboxylic acid, 4-carboxycinnamic acid or their C1–C20-alkyl esters or C5–C12-aryl esters or their acid anhydrides or acid chlorides.

5. The membrane as claimed in claim 1, wherein said aromatic carboxylic acids used are tricarboxylic acids, tetracarboxylic acids or their C1–C20-alkyl esters or C5–C12-aryl esters or their acid anhydrides or acid chlorides.

6. The membrane as claimed in claim 5, wherein said aromatic carboxylic acids are 1,3,5-benzene-tricarboxylic acid (trimesic acid); 1,2,4-benzenetricarboxylic acid (trimellitic acid); (2-carboxyphenyl)iminodiacetic acid, 3,5,3'-biphenyltricarboxylic acid; 3,5,4'-biphenyltricarboxylic acid or 2,4,6-pyridinetricarboxylic acid or mixtures thereof.

7. The membrane as claimed in claim 1, wherein said aromatic carboxylic acids used are tetracarboxylic acids, their C1–C20-alkyl esters or C5–C12-aryl esters or their acid anhydrides or acid chlorides.

8. The membranes as claimed in claim 7, wherein said aromatic carboxylic acids are benzene-1,2,4,5-tetracarboxylic acid; naphthalene-1,4,5,8-tetracarboxylic acid, 3,5,3',5'-biphenyltetracarboxylic acid; benzophenonetetracarboxylic acid, 3,3',4,4'-biphenyltetracarboxylic acid, 2,2',3,3'-biphenyltetracarboxylic acid, 1,2,5,6-naphthalenetetracarboxylic acid, or 1,4,5,8,7-naphthalenetetracarboxylic acid.

9. The membrane as claimed in claim 5, wherein the content of tricarboxylic acids or tetracarboxylic acids (based on dicarboxylic acid used) is from 0 to 30 mol %.

10. The membrane as claimed in claim 5, wherein the content of tricarboxylic acids or tetracarboxylic acids (based on dicarboxylic acid used) is from 0.1 to 20 mol %.

11. The membrane as claimed in claim 5, wherein the content of tricarboxylic acids or tetracarboxylic acids (based on dicarboxylic acid used) is from 0.5 to 10 mol %.

12. The membrane as claimed in claim 5, wherein heteroaromatic carboxylic acids used are heteroaromatic dicarboxylic acids and tricarboxylic acids and tetracarboxylic acids which have at least one nitrogen, oxygen, sulfur or phosphorus atom in the aromatic, also their C1–C20-alkyl esters or C5–C12-aryl esters or their acid anhydrides or acid chlorides.

13. The membrane as claimed in claim 12, wherein said heteroaromatic carboxylic acids are pyridine-2,5-dicarboxylic acid, pyridine-3,5-dicarboxylic acid, pyridine-2,6-dicarboxylic acid, pyridine-2,4-dicarboxylic acid, 4-phenyl-2,5-pyridinedicarboxylic acid, 3,5-pyrazoledicarboxylic acid, 2,6-pyrimidinedicarboxylic acid, 2,5-pyrazinedicarboxylic acid, or 2,4,6-pyridinetricarboxylic acid.

14. The membrane as claimed in claim 1, wherein a polyphosphoric acid having an assay calculated as $P_2O_5$ (acidimetric) of at least 85% is used in step B).

15. The membrane as claimed in claim 1, wherein a dispersion/suspension instead of a solution of the prepolymer is produced in step B).

16. The membrane as claimed in claim 1, wherein a polyazole-based polymer comprising recurring azole units of the formulas (I), (II), (III), (IV), (V), (VI), (VII), (VIII), (IX), (X), (XI), (XII), (XIII), (XIV), (XV), (XVI), (XVII), (XVIII), (XIX), (XX), (XXI) or (XXII) or mixtures thereof (I)

-continued (II)

(III)

(IV)

(V)

(VI)

(VII)

(VIII)

(IX)

(X)

-continued

(XI)

(XII)

(XIII)

(XIV)

(XV)

(XVI)

(XVII)

(XVIII)

(XIX)

(XX)

-continued (XXI)

(XXII)

wherein

Ar are identical or different and are each a tetravalent aromatic or heteroaromatic group which optionally have one or more rings, $Ar_1$ are identical or different and are each a divalent aromatic or heteroaromatic group which optionally have one or more rings, $Ar_2$ are identical or different and are each a divalent or trivalent aromatic or heteroaromatic group which optionally have one or more rings, $Ar_3$ are identical or different and are each a trivalent aromatic or heteroaromatic group which optionally have one or more rings, $Ar_4$ are identical or different and are each a trivalent aromatic or heteroaromatic group which optionally have one or more rings, $Ar_5$ are identical or different and are each a tetravalent aromatic or heteroaromatic group which optionally have one or more rings, $Ar_6$ are identical or different and are each a divalent aromatic or heteroaromatic group which optionally have one or more rings, $Ar_7$ are identical or different and are each a divalent aromatic or heteroaromatic group which optionally have one or more rings, $Ar_8$ are identical or different and are each a trivalent aromatic or heteroaromatic group which optionally have one or more rings, $Ar_9$ are identical or different and are each a divalent or trivalent or tetravalent aromatic or heteroaromatic group which optionally have one or more rings,

$Ar_{10}$ are identical or different and are each a divalent or trivalent aromatic or heteroaromatic group which optionally have one or more rings, $Ar_{11}$ are identical or different and are each a divalent aromatic or heteroaromatic group which optionally have one or more rings, X are identical or different and are each oxygen, sulfur or an amino group bearing a hydrogen atom, a group having 1–20 carbon atoms, R are identical or different and are each hydrogen an alkyl group or an aromatic group and n and m are each an integer greater than or equal to 10, where
R' are identical or different and are each an alkyl group or an aromatic group and
n is an integer greater than or equal to 10,
is formed in step C).

17. The membrane as claimed in claim 16, wherein n and m are each an integer greater than 100.

18. The membrane as claimed in claim 1, wherein a polymer selected from the group consisting of polybenzimidazole, poly(pyridines), poly(pyrimidines), polyimidazoles, polybenzothiazoles, polybenzoxazoles, polyoxadiazoles, polyquinoxalines, polythiadiazoles and poly(tetrazapyrenes) is formed in step C).

19. A membrane as claimed in claim 1, wherein the polymer formed in step C) comprises recurring benzimidazole units of the formula -continued wherein n and m are each an integer greater than or equal to 10.

20. The membrane as claimed in claim 19 wherein n and m are each an integer greater than or equal to 100.

21. The membrane as claimed in claim 1, wherein the viscosity is adjusted by addition of phosphoric acid after step C) and before step D).

22. The membrane as claimed in claim 1, wherein the membrane produced in step D) is treated in the presence of moisture at temperatures and for a time until the membrane is self-supporting and can be detached from the support without damage.

23. The membrane as claimed in claim 1, wherein the treatment of the membrane in step E) is carried out at temperatures of from 0° C. to 150° C. in the presence of moisture or water and/or water vapor.

24. The membrane as claimed in claim 1, wherein the treatment of the membrane in step E) is carried out at temperatures of from 10° C. to 120° C. in the presence of moisture or water and/or water vapor.

25. The membrane as claimed in claim 1, wherein the treatment of the membrane in step E) is carried out at temperatures of from 20° C. to 90° C. in the presence of moisture or water and/or water vapor.

26. The membrane as claimed in claim 1, wherein the treatment of the membrane in step E) is carried out for from 10 seconds to 300 hours.

27. The membrane as claimed in claim 1, wherein the treatment of the membrane in step E) is carried out for from 1 minute to 200 hours.

28. The membrane as claimed in claim 1, wherein an electrode is chosen as support in step D) and the treatment in step E) is such that the membrane formed is no longer self-supporting.

29. The membrane as claimed in claim 1, wherein the membrane formed in step D) has a thickness of from 20 to 4000 μm.

30. The membrane as claimed In claim 1, wherein the membrane formed in step E) has a thickness of from 15 to 3000 μm and is self-supporting.

31. The membrane as claimed in claim 1, wherein the membrane formed in step E) has a thickness of from 20 to 2000 μm, and is self-supporting and the membrane formed in step D) has a thickness of from 30 to 3500 μm.

32. The membrane as claimed in claim 1, wherein the membrane formed in step E) has a thickness of from 20 to 1500 μm, and is self-supporting and the membrane formed in step D) has a thickness of from 50 to 3000 μm.

33. An electrode provided with a proton-conducting polymer coating based on polyazoles which is obtained by a process comprising the steps A) Reacting one or more aromatic tetraamino compounds with one or more aromatic carboxylic acids or esters thereof which contain at least two acid groups per carboxylic acid monomer, or of one or morn aromatic and/or heteroaromatic diaminocarboxylic acids in the melt at temperatures of up to 350° C., B) Dissolution of the solid prepolymer obtained as described in step A) in polyphosphoric acid, C) Heating of the solution obtained as described in step B) to temperatures of up to 300°C., under inert gas to form the dissolved polyazole polymer, D) Application of a layer to an electrode using the solution of the polyazole polymer from step C), and E) Treating the layer formed in step D).

34. The electrode as claimed in claim 33, wherein step A is conducted at temperatures up to 300° C. and step C is conducted at temperatures up to 280° C.

35. An electrode as claimed in claim 33, wherein the coating has a thickness of from 2 to 3000 μm.

36. An electrode as claimed in claim 35, wherein the coating has a thickness of from 3 to 2000 μm.

37. An electrode as claimed in claim 33, wherein the coating has a thickness of from 5 to 1500 μm.

38. A membrane-electrode unit comprising at least one electrode and at least one membrane as claimed in claim 1.

39. A membrane-electrode unit comprising at least one electrode as claimed in claim 35 and at least one membrane.

40. A fuel cell comprising one or more membrane-electrode units as claimed in claim 39.

* * * * *

UNITED STATES PATENT AND TRADEMARK OFFICE
CERTIFICATE OF CORRECTION

| | |
|---|---|
| PATENT NO. | : 7,235,320 B2 |
| APPLICATION NO. | : 10/472810 |
| DATED | : June 26, 2007 |
| INVENTOR(S) | : Gordon Calundann et al. |

It is certified that error appears in the above-identified patent and that said Letters Patent is hereby corrected as shown below:

Column 21, delete the first occurrence of figure (XX).

Column 26, "The membrane as claimed In claim 1. wherein the" should read -- The membrane as claimed in claim 1. wherein the --.

Column 27, "carboxylic acid monomer, or of one morn arometic" should read -- carboxylic acid monomer, or of one more aromatic --.

Signed and Sealed this

Sixth Day of November, 2007

JON W. DUDAS
*Director of the United States Patent and Trademark Office*